United States Patent
Boström et al.

(10) Patent No.: US 7,775,557 B2
(45) Date of Patent: Aug. 17, 2010

(54) PERSONAL RESTRAINT SYSTEM

(75) Inventors: Ola Boström, Alingsas (SE); Yngve Haland, Falsterbo (SE); Leif Ennerdahl, Alingsas (SE); Thomas Blomberg, Skara (SE)

(73) Assignee: Autoliv Development AB, Vargarda (SE)

( * ) Notice: Subject to any disclaimer, the term of this patent is extended or adjusted under 35 U.S.C. 154(b) by 586 days.

(21) Appl. No.: 10/582,300

(22) PCT Filed: Oct. 22, 2004

(86) PCT No.: PCT/EP2004/011938

§ 371 (c)(1),
(2), (4) Date: Mar. 26, 2007

(87) PCT Pub. No.: WO2005/061288

PCT Pub. Date: Jul. 7, 2005

(65) Prior Publication Data

US 2008/0036190 A1 Feb. 14, 2008

(30) Foreign Application Priority Data

Dec. 9, 2003 (DE) .................. 103 57 368

(51) Int. Cl.
*B60R 22/00* (2006.01)
(52) U.S. Cl. .............. 280/801.1; 180/268; 280/807; 280/808; 297/468; 297/484
(58) Field of Classification Search .......... 180/268; 280/801.1, 806–808; 297/468, 474–479, 297/483, 484
See application file for complete search history.

(56) References Cited

U.S. PATENT DOCUMENTS

| | | | | |
|---|---|---|---|---|
| 4,198,011 A | * | 4/1980 | Kamijo et al. | 242/385.3 |
| 5,123,673 A | | 6/1992 | Tame | |
| 5,553,804 A | * | 9/1996 | Hamann | 242/382.4 |
| 5,611,604 A | | 3/1997 | Thomas et al. | |
| 6,042,190 A | | 3/2000 | Mathe et al. | |
| 6,155,601 A | | 12/2000 | Cantor et al. | |
| 6,659,505 B1 | | 12/2003 | Knox | |
| 6,729,693 B2 | | 5/2004 | Soderstrom et al. | |
| 6,769,716 B2 | * | 8/2004 | Rouhana et al. | 280/806 |

(Continued)

FOREIGN PATENT DOCUMENTS

DE 43 22 798 A1 2/1994

(Continued)

*Primary Examiner*—Lesley Morris
*Assistant Examiner*—James English
(74) *Attorney, Agent, or Firm*—Brinks Hofer Gilson & Lione

(57) ABSTRACT

A personal restraint system for a seat in a motor vehicle including a three-point belt system and a two-point belt system. The three-point belt system including a first belt retractor, and a first belt web having a first belt latch plate, and a first belt buckle. The two-point belt system including a second belt retractor, and a second belt web having a second belt latch plate, and a second belt buckle. The second belt retractor including a blocking device which engages a spool of the second belt retractor when both belt webs are wound up on their respective retractors to prevent engagement of the two-point belt system if the three-point belt system is not engaged.

11 Claims, 4 Drawing Sheets

U.S. PATENT DOCUMENTS

| | | | |
|---|---|---|---|
| 6,817,629 B2 * | 11/2004 | Herberg et al. | 280/801.1 |
| 6,824,222 B2 * | 11/2004 | Maloney et al. | 297/478 |
| 6,869,105 B2 * | 3/2005 | Cheng | 280/804 |
| 6,969,088 B2 * | 11/2005 | Wang | 280/802 |
| 7,140,571 B2 * | 11/2006 | Hishon et al. | 242/390.8 |
| 7,364,199 B2 * | 4/2008 | Elizondo et al. | 280/801.1 |
| 2001/0040065 A1 | 11/2001 | Takagi et al. | |
| 2002/0089163 A1 | 7/2002 | Bedewi et al. | |
| 2004/0004350 A1 * | 1/2004 | Rogers et al. | 280/801.1 |
| 2005/0067827 A1 * | 3/2005 | Bostrom et al. | 280/801.1 |

FOREIGN PATENT DOCUMENTS

| | | |
|---|---|---|
| DE | 19629878 A1 | 1/1998 |
| DE | 69612994 T2 | 10/2001 |
| DE | 102 04 477 A1 | 8/2003 |
| EP | 0 627 345 A1 | 12/1994 |
| GB | 2395465 | 5/2004 |

* cited by examiner

PERSONAL RESTRAINT SYSTEM

CROSS REFERENCE TO RELATED APPLICATIONS

This application claims priority to PCT/EP2004/011938 filed Oct. 22, 2004 and to DE 10357368.2 filed Dec. 9, 2003.

BACKGROUND

1. Field of the Invention

The present invention relates to a personal restraint system for motor vehicles. More particularly, the present invention relates to a seat belt system for a seat of the motor vehicle having a three-point belt system and a two-point belt system.

2. Description of Related Art

Personal restraint systems, such as seat belts, have been used for years in motor vehicles. In addition to a conventional three-point belt system, some seat belts systems include an additional two-point belt system which is arranged in such a manner that the belt webs of the two belt systems cross in the chest region of the occupant. This results in a four-point belt system. Compared to the conventional three-point belt system, such a four-point belt system has the advantage of substantially better protective action in the event of a side impact.

However, the four-point belt system only has its improved protective effect when the occupant uses it properly. This means both the three-point system and the two-point system are engaged. Thus, it is desirable to prevent the occupant from putting on the two-point system exclusively, because not only is there no improvement in this case, but it results in a reduced protective effect compared to the three-point system alone.

It is the object of the present invention to provide an improved four-point personal restraint system where it is impossible for the occupant to belt himself/herself exclusively with the two-point belt system. This must happen in a manner that rescue of the occupant is not impaired in the event of an accident.

SUMMARY OF THE INVENTION

A retractor of a two-point belt system of a personal restraint system according to the present invention includes a blocking device that prevents the belt web of the two-point belt system from being pulled out from a retractor when the three-point system is not engaged. To keep the two-point belt retractor from also being blocked when the three-point belt is released first during unbuckling, the blocking device remains lifted until the two-point system is also released. In other words, blocking of the two-point belt system retractor occurs only when both belt webs are wound up on their respective roller.

The blocking device for the retractor of the two-point belt system preferably operates magnetically.

As already presented, it is necessary to detect whether the two belt webs are in their respective rolled up or unrolled states. This can be accomplished either by sensors in the belt buckles or by sensors in the retractors themselves.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

The invention will now be explained in more detail based on exemplary embodiments referring to the figures. The drawing shows.

DETAILED DESCRIPTION

Figure 6:
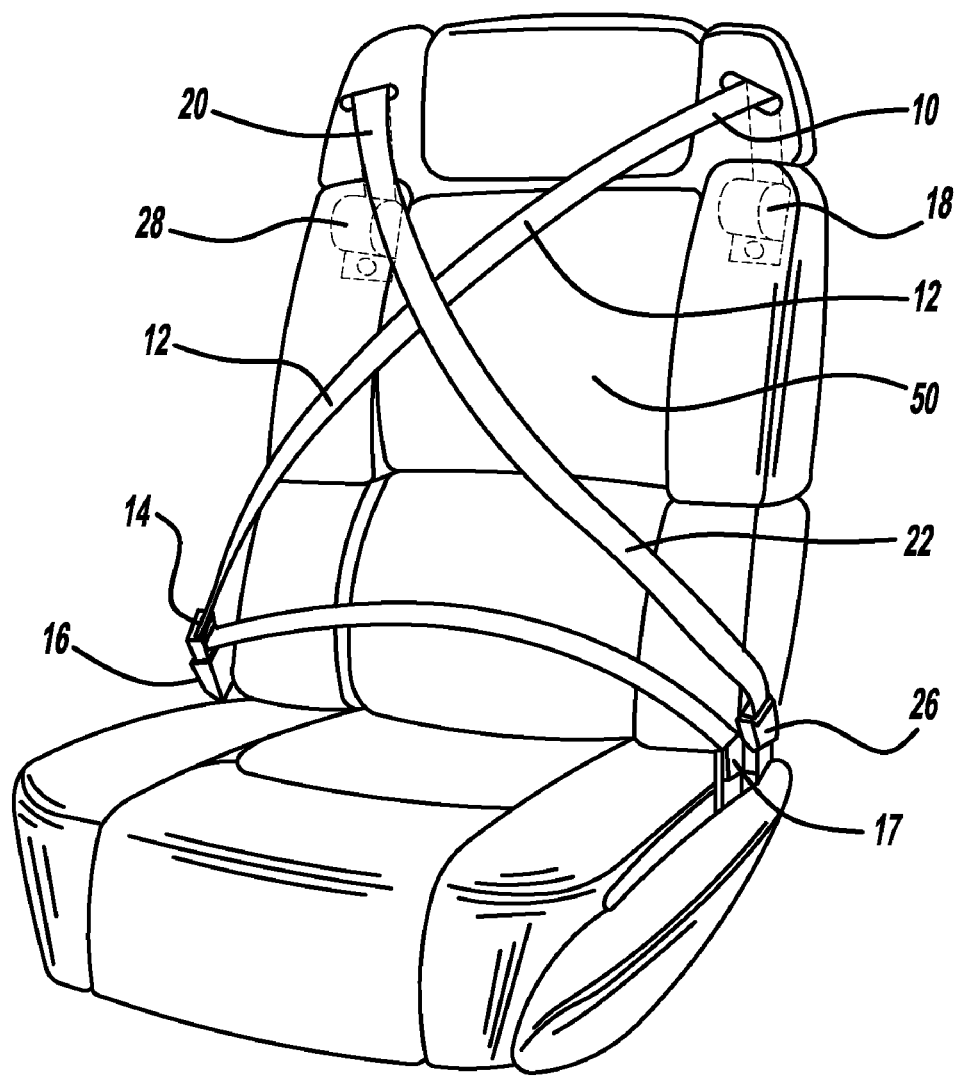
FIG. 6 shows a seat incorporating a belt system according to the present invention.

FIG. 6 shows a vehicle seat 50, which includes a four-point belt system. This four-point belt system consists of a three-point belt system 10 and a two-point belt system 20. The three-point system is constructed in a conventional manner and comprises a first belt web 12, which extends between a first belt retractor 18 and an anchor point 17. Moreover, the first belt web 12 carries a first latch plate 14, which can be inserted into a first belt buckle 16.

The upper and lower fastening points of the three-point belt system and the two-point system can be arranged directly on the seat as well as on external points of the vehicle structure. The B-pillar or C-pillar or even the roof structure come into consideration for the upper fastening points. The seat itself, the seat rail or even the floor assembly of the vehicle offer themselves for the lower fastening points.

In the two-point belt system 20, the second belt web 22 extends from a second belt retractor 28 to a second latch plate, which here is inserted into a second belt buckle 26.

Figures 1, 2:
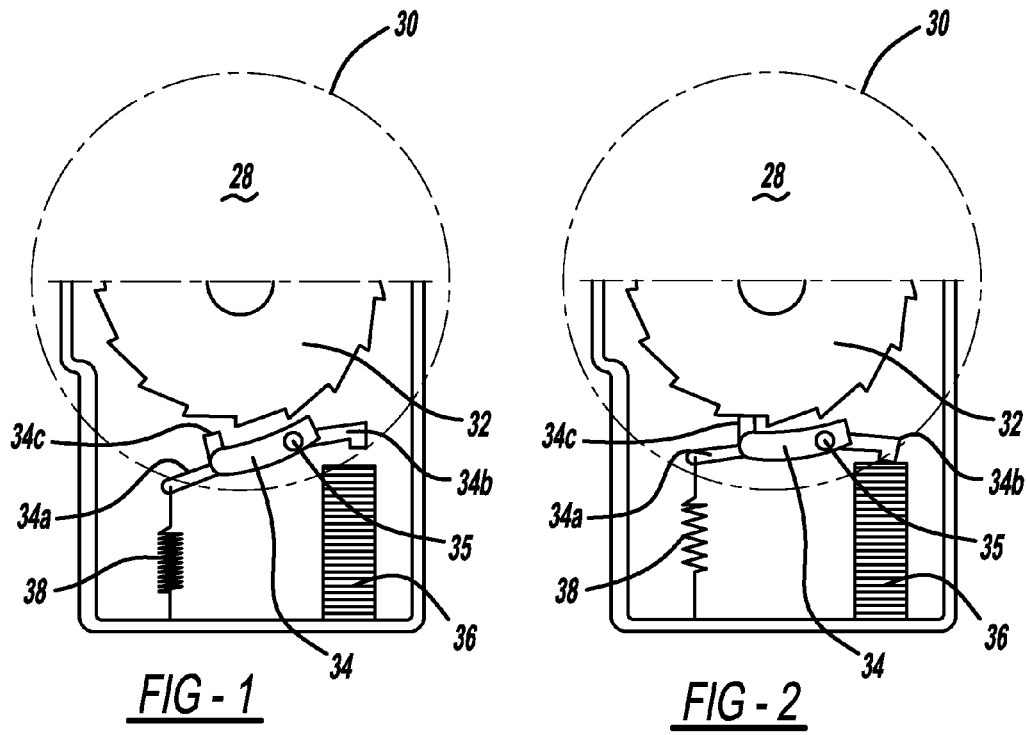
FIG. 1 shows a retractor according to the present invention including a magnetically operated blocking device shown in a disengaged condition.
FIG. 2 shows the roller of FIG. 1 in an engaged condition.

According to the present invention, the second belt retractor 28 includes a blocking device as depicted in FIGS. 1 and 2. This blocking device is independent of any emergency retractor locking device, which may operate as both belt-web-sensitive and acceleration-sensitive. The blocking device depicted here serves exclusively for the purpose of keeping the occupant from buckling himself/herself exclusively with the two-point belt system 20.

The blocking device of this exemplary embodiment comprises a toothed wheel 32, which is rigidly connected to a belt spool 30 and can be blocked in the unwinding direction by engagement of the blocking lever 34 with the toothed wheel 32. For this, the blocking lever 34 is swivel-mounted around the axle 35. The blocking lever 34 has two arms 34a and 34b. The first arm 34a is connected to a tension spring 38, which pulls the blocking lever 34 into a position in which the catch 34c is disengaged from the toothed wheel 32. In this state, there is no blocking of the second belt retractor 28 as shown in FIG. 1. The second blocking lever 34b is linked to an actuator 36. If the actuator 36 is switched on, then it pulls on the second arm 34b and the blocking lever 34 swivels into a position in which the catch 34c engages the toothed wheel 32, and the second belt retractor 28 is blocked, preventing rotation of the spool 30 as shown in FIG. 2.

The actuator 36 may be any appropriate device capable of pulling on the second arm 34b. For example, the actuator 36 may be an electric motor, a solenoid, or, as shown in the preferred embodiment, an electromagnet magnetically linked to the blocking lever 34b.

Figure 3:
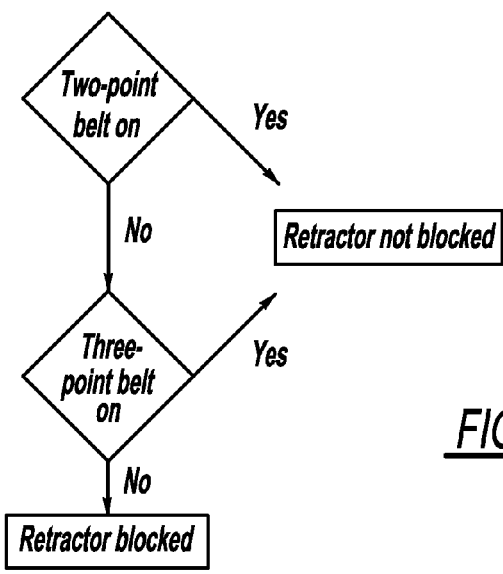
FIG. 3 shows a logic diagram on which control of the blocking device is based.

The control of the actuator 36 proceeds according to a logic diagram illustrated in FIG. 3. If the belt of the two-point belt system 20 has been put on, then the electromagnet 36 is turned off and the second roller 28 is not blocked. If the belt of the two-point belt system 20 has not been put on, then the electromagnet 36 is turned on if the belt of the three-point system 10 has not been put on. If, however, the belt of the three-point belt system 10 has been put on, the blocking of the second belt retractor 28 is lifted by turning off the electromagnet 36.

This produces the following: If the occupant would first like to belt himself/herself with the two-point belt system, then this isn't possible because of the blocking of the second belt retractor 28. As soon as the occupant has put on the belt of the three-point system, then the blocking is lifted and the belt of the two-point system can be put on. The unblocked state of the second belt retractor 28 is maintained until both belts are released, so that it does not matter in what sequence the two belt buckles are opened when climbing out or in the event of an accident. The fact that the blocking of the second belt retractor 28 is always lifted in a de-energized state ensures that the second roller is not blocked in the event that the power supply of the vehicle is interrupted during an accident.

Figure 4:
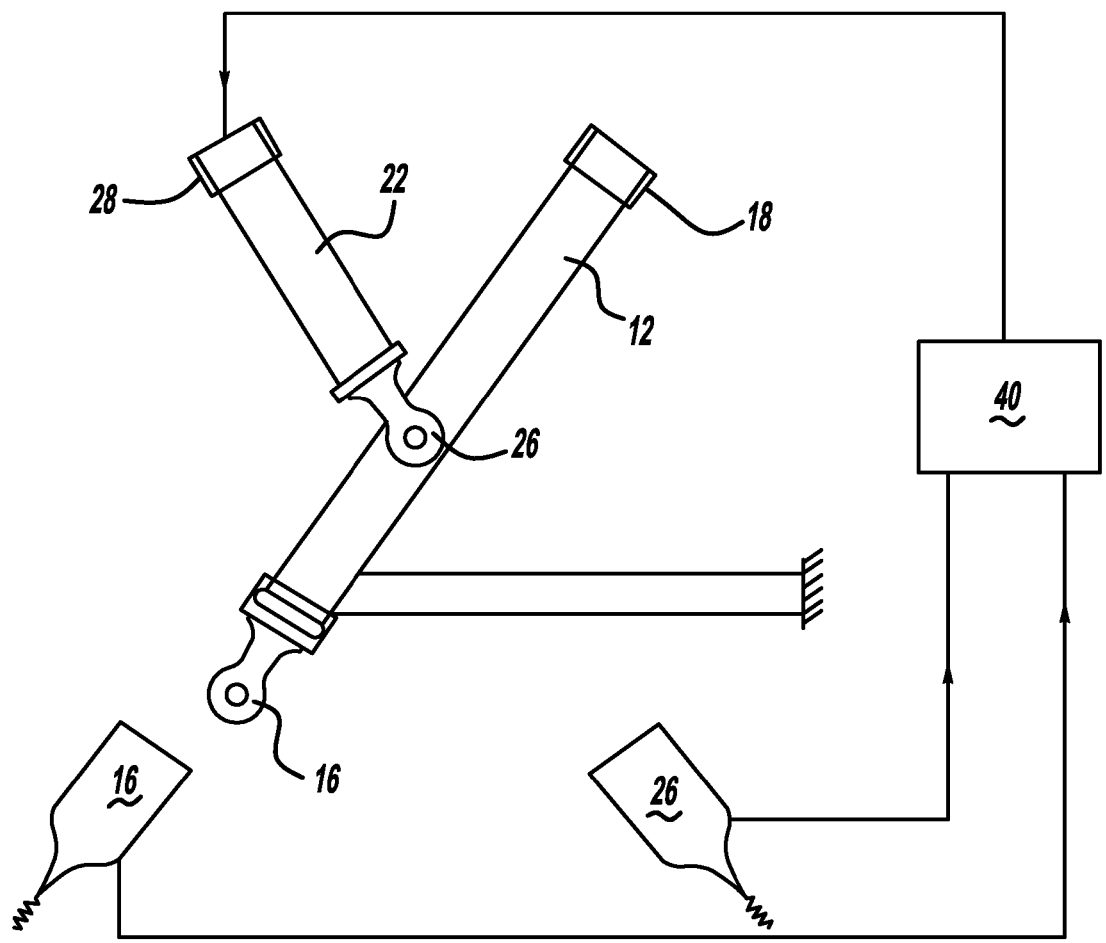
FIG. 4 shows a schematic diagram of a four-point personal restraint system in accordance with a first exemplary embodiment.
Figure 5:
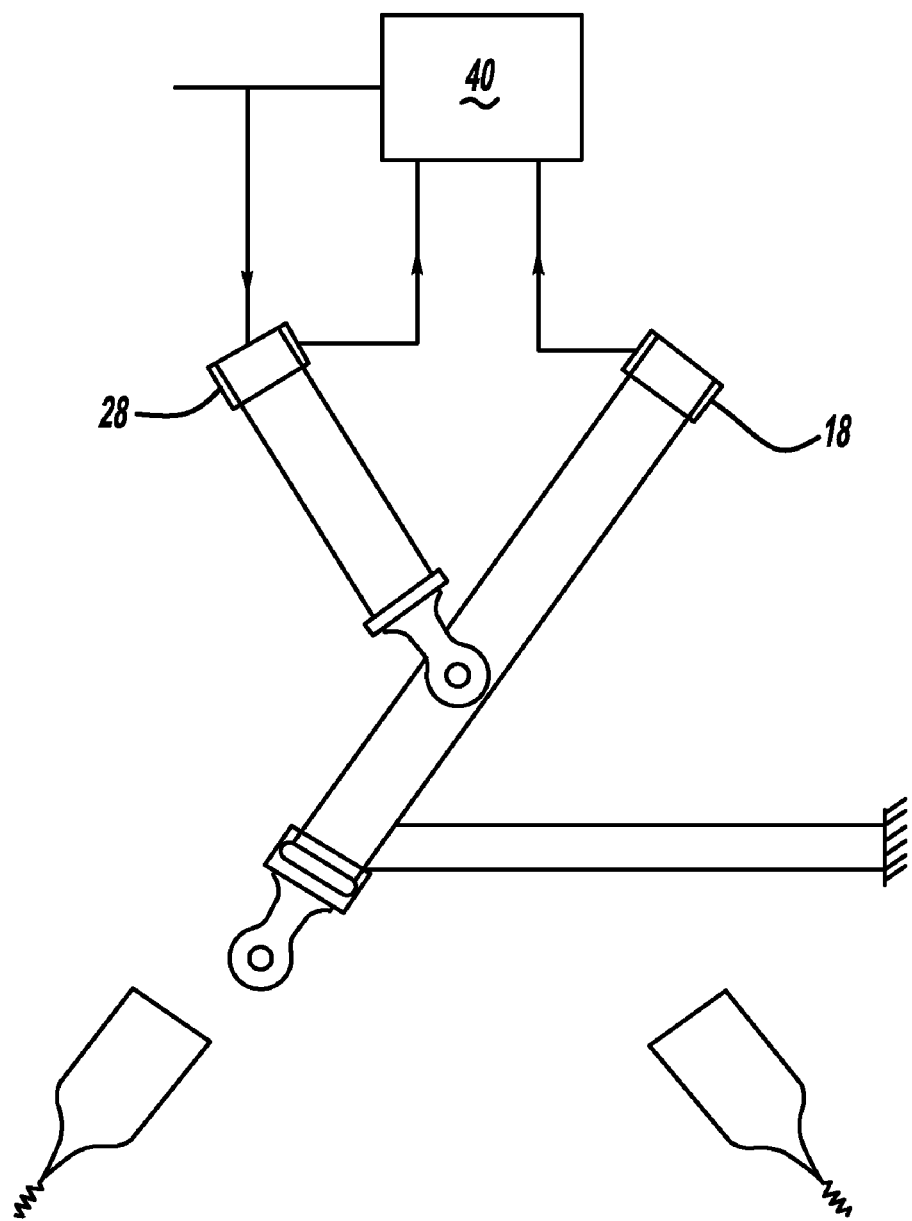
FIG. 5 shows a schematic diagram of a four-point personal restraint system in accordance with a second exemplary embodiment.

FIGS. 4 and 5 illustrate two examples of how the necessary information concerning the state of the belt webs (wound up, or not wound up) can be obtained. In the context of the logic diagram just disclosed, belt web wound up on the roller means: belt not put on; belt unwound from the respective roller means: belt put on.

FIG. 4 is an example in which the necessary information concerning the state of the belt webs is obtained by sensors in the belt buckles 16 and 26. Here the message "belt tongue in belt buckle" is equivalent to "belt unwound from roller," that is to say, the belt has been put on. The signals of the sensors in the belt buckles 16, 26 are fed to a logic unit 40, for example a digital microprocessor, which in turn controls the electromagnet 36 in the second belt retractor 28 based on the logic described above.

In the exemplary embodiment shown in FIG. 5, the necessary information is detected by revolution counters in the belt retractors 18 and 28. Here for example, the signal "belt put on" can be generated when the belt web has unwound a particular number of revolutions, for example two, from each respective belt retractor 18 and 28.

Mixtures of the exemplary embodiments shown in FIGS. 4 and 5 are also conceivable, possibly to the effect that the information about the state of the three-point belt system 10 is obtained by a sensor in the first belt buckle 16 and the information about the state of the two-point belt system by a counter in the second belt retractor 28.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

The invention claimed is:

1. A personal restraint system for a seat in a motor vehicle comprising:
    a three-point belt system comprising a first belt retractor, a first belt web having a first latch plate, and a first belt buckle,
    a two-point belt system comprising a second belt retractor, a second belt web having a second latch plate, and a second belt buckle, wherein
    the second belt retractor includes a blocking device having an actuator that is energized to cause blocking of a spool of the second belt retractor defining a blocking state so as to prevent the second belt retractor from unwinding when both belt webs are wound up on their respective retractors, and the spool of the second belt retractor is unblocked defining an unblocking state to allow the second belt retractor to unwind when the actuator is de-energized, and wherein the blocking state of the second belt retractor is changed to the unblocking state when the first latch plate is situated in the first belt buckle, and if the second latch plate is situated in the second belt buckle, then the unblocking state of the second belt retractor is maintained until both the first latch plate is not situated in the first belt buckle and the second latch plate is not situated in the second belt buckle.

2. A personal restraint system according to claim 1, wherein the actuator is energized to engage the blocking device with the spool.

3. A personal restraint system according to claim 2, further including at least one sensor.

4. A personal restraint system according to claim 3, wherein the sensor is disposed in at least one retractor, the sensor being configured as a revolution counter.

5. A personal restraint system according to claim 3, wherein the sensor is disposed in at least one belt buckle, the sensor being configured to detect whether a latch plate is situated within the belt buckle.

6. A personal restraint system according to claim 3, further including two sensors, one being a revolution counter disposed in a retractor and another being configured to detect whether a latch plate is situated within one of the belt buckles.

7. A personal restrain system according to claim 3, wherein a logic unit controls engagement of the blocking device.

8. A personal restraint system according to claim 7, wherein the logic unit is electrically coupled to the actuator and the sensor.

9. A personal restraint system according to claim 2, wherein the actuator operates electromagnetically.

10. A personal restraint system according to claim 6, wherein the actuator is an electromagnet magnetically linked to a blocking lever of the blocking device.

11. A method of operating a personal restraint system having a two-point belt system and a three-point belt system, the method comprising:
    sensing engagement of the two-point belt system;
    sensing engagement of the three-point belt system;
    blocking engagement of the two-point belt system if the three-point belt system is not engaged including energizing an actuator so as to prevent movement of the two-point belt system in the unwinding direction to prevent engagement of the two-point belt system and to define a blocking state;
    unblocking engagement of the two-point belt system if the three-point belt system is engaged including de-energizing the actuator so as to allow movement of the two-point belt system in the unwinding direction to allow engagement of the two-point belt system and to define an unblocking state, wherein if the two-point belt system is engaged, then the unblocking state is maintained to allow movement of the two-point belt system in the unwinding direction until both the two-point and three-point belt systems are disengaged.

* * * * *